United States Patent
Goswami et al.

(10) Patent No.: US 8,060,253 B2
(45) Date of Patent: Nov. 15, 2011

(54) SYSTEMS AND METHODS FOR CONTROLLING A LEGGED ROBOT BASED ON RATE OF CHANGE OF ANGULAR MOMENTUM

(75) Inventors: Ambarish Goswami, Fremont, CA (US); Vinutha Kallem, Baltimore, MD (US)

(73) Assignee: Honda Motor Co., Ltd., Tokyo (JP)

( * ) Notice: Subject to any disclaimer, the term of this patent is extended or adjusted under 35 U.S.C. 154(b) by 1908 days.

(21) Appl. No.: 11/096,835

(22) Filed: Mar. 31, 2005

(65) Prior Publication Data

US 2005/0234593 A1    Oct. 20, 2005

Related U.S. Application Data

(60) Provisional application No. 60/558,367, filed on Mar. 31, 2004.

(51) Int. Cl.
*G05B 19/19* (2006.01)
*G06F 19/00* (2011.01)
*G05B 19/408* (2006.01)

(52) U.S. Cl. .................. 700/250; 700/245; 318/568.23; 901/1; 901/50

(58) Field of Classification Search .................. 700/245, 700/250, 254, 260, 258, 262; 318/568.12, 318/568.17, 568.18, 568.23; 901/1, 50
See application file for complete search history.

(56) References Cited

U.S. PATENT DOCUMENTS

| | | | |
|---|---|---|---|
| 5,357,433 A | | 10/1994 | Takenaka et al. |
| 5,513,106 A | * | 4/1996 | Yoshino et al. .................. 701/23 |
| 6,505,096 B2 | * | 1/2003 | Takenaka et al. ............. 700/245 |
| 7,000,933 B2 | | 2/2006 | Arling et al. |
| 7,053,577 B2 | | 5/2006 | Nagasaka |
| 7,076,337 B2 | | 7/2006 | Kuroki et al. |
| 7,113,849 B2 | | 9/2006 | Kuroki et al. |
| 7,217,247 B2 | | 5/2007 | Dariush et al. |

(Continued)

FOREIGN PATENT DOCUMENTS

WO   PCT/JP03/003131   *  3/2003

(Continued)

OTHER PUBLICATIONS

Jianwen Wendy Gu, "The Regulation of Angular Walking During Human Walking" (Jun. 2003) B.S. thesis MIT.*

(Continued)

*Primary Examiner* — Thomas G. Black
*Assistant Examiner* — Christine Behncke
(74) *Attorney, Agent, or Firm* — Fenwick & West LLP; Mark E. Duell

(57) ABSTRACT

Systems and methods are presented that use the rate of change of a legged robot's centroidal angular momentum ($\dot{H}_G$) in order to maintain or improve the robot's balance. In one embodiment, a control system determines the current value of $\dot{H}_G$, compares this value to a threshold value, and determines an instruction to send to the robot. Executing the instruction causes the robot to remain stable or become more stable. Systems and methods are also presented that use a value derived from $\dot{H}_G$ in order to maintain or improve the robot's balance. In one embodiment, a control system determines the location of the Zero Rate of change of Angular Momentum (ZRAM) point (A), determines the distance between A and the location of the center of pressure of the resultant ground force, compares this value to a threshold value, and determines an instruction to send to the robot.

21 Claims, 7 Drawing Sheets

U.S. PATENT DOCUMENTS

| | | | |
|---|---|---|---|
| 7,313,463 | B2 | 12/2007 | Herr et al. |
| 7,370,713 | B1 | 5/2008 | Kamen |
| 2005/0001575 | A1 | 1/2005 | Furuta et al. |
| 2005/0051368 | A1* | 3/2005 | Takenaka et al. ............... 180/8.6 |
| 2005/0055131 | A1* | 3/2005 | Mikami et al. ................ 700/245 |
| 2005/0240307 | A1 | 10/2005 | Kuroki et al. |
| 2005/0267630 | A1 | 12/2005 | Kajita et al. |
| 2006/0139355 | A1 | 6/2006 | Tak et al. |

FOREIGN PATENT DOCUMENTS

| | | | |
|---|---|---|---|
| WO | WO03/057425 | * | 7/2003 |

OTHER PUBLICATIONS

Hardt, etc et al. "Increasing Stability in Dynamic Gaits using Numerical Optimization" 15th Triennial World Congress, Barcelona, Spain, Jul. 21-26, 2002.*

Hardt et al., The Role of Motion Dynamics in the Design, Control and Stability of Bipedal and Quadrupedal Robots (2003) RoboCup 2002: Robot Soccer World, pp. 206-223.*

Sano et al., Realization of natural dynamic walking using the angular momentum information (May 1990) 1990 IEEE Internation Conference on Robotics and Automation, pp. 1476-1481.*

Elftman, The Rotation of the body of Walking (1938) Department of Zoology, Columbia University, pp. 33-40.*

H. Elftman, "The Rotation of the Body in Walking" European Journal of Applied Physiology and Occupational Physiology, vol. 10, No. 5, May 1939, p. 477-484.*

Dempster, W.T., "The Anthropometry of Body Action," *Annals of the New York Academy of Sciences*, vol. 63, Art. 4, 1955, pp. 559-585.

Goswami, A. et al., "Rate of Change of Angular Momentum and Balance Maintenance of Biped Robots," *Proceedings of the 2004 IEEE International Conference on Robotics & Automation (ICRA)*, New Orleans, LA, Apr. 2004, pp. 3785-3790.

Goswami, A., "Postural Stability of Biped Robots and the Foot-Rotation Indicator (FRI) Point," *The International Journal of Robotics Research*, vol. 18, No. 6, 1999, pp. 523-533.

Greenwood, D. T., "Chapter 4: Dynamics of a System of Particles, Sec. 4-5: Angular Momentum," *Principles of Dynamics*, 1965, pp. 142-145, Prentice-Hall, Inc., New Jersey.

Gu, J. W., "The Regulation of Angular Momentum During Human Walking," Thesis, Massachusetts Institute of Technology, Jun. 2003.

Harada, K. et al., "Pushing Manipulation by Humanoid Considering Two-Kinds of ZMPs", *Proceedings of the IEEE International Conference on Robotics & Automation (ICRA)*, Sep. 2003, Taipei, Taiwan, pp. 1627-1632.

Hardarson, F., "Stability Analysis and Synthesis of Statically Balanced Walking for Quadruped Robots," Ph.D. Dissertation, Royal Institute of Technology, Stockholm, 2002.

Herr, H. et al., "Chapter 5: Cyborg Technology—Biomimetic Orthotic and Prosthetic Technology," Biologically-Inspired Intelligent Robots, Y. Bar-Cohen and C. Breazeal, Bellingham, Washington, SPIE Press, 2003, pp. 103-143.

Hirai, K. et al., "The Development of Honda Humanoid Robot," *Proceedings of the IEEE International Conference on Robotics & Automation (ICRA)*, Belgium, 1998, pp. 1321-1326.

Hofmann, A., et al., "A Sliding Controller for Bipedal Balancing Using Integrated Movement of Contact and Non-Contact Limbs," Proceedings of the *IEEE/RSJ International Conference on Intelligent Robots and Systems*, Japan, 2004, pp. 1952-1959.

Huang, Q. et al., "Planning Walking Patterns for a Biped Robot," *IEEE Transactions on Robotics and Automation*, vol. 17, No. 3, 2001, pp. 280-289.

Ito, S. et al., "A Consideration on Position of Center of Ground Reaction Force in Upright Posture," *Proceedings of the Society of Instrument and Control Engineers (SICE) Annual Conference*, Osaka, Japan, Aug. 2002, pp. 1225-1230.

Kagami, S. et al., "AutoBalancer: An Online Dynamic Balance Compensation Scheme for Humanoid Robots," *Proceedings of the 4th International Workshop on the Algorithmic Foundations of Robotics*, 2000, pp. 329-339.

Kajita, S. et al., "Resolved Momentum Control: Humanoid Motion Planning Based on the Linear and Angular Momentum," *Proceedings of the IEEE/RSJ International Conference on Intelligent Robots and Systems*, Las Vegas, NV, 2003, pp. 1644-1650.

Katić, D. et al., "Survey of Intelligent Control Techniques for Humanoid Robots," *Journal of Intelligent and Robotic Systems*, vol. 37, 2003, pp. 117-141.

Kurazume, R. et al., "The Sway Compensation Trajectory for a Biped Robot," *Proceedings of the IEEE International Conference on Robotics & Automation (ICRA)*, 2003, Taiwan, pp. 925-931.

Li, Q. et al., "Learning Control of Compensative Trunk Motion for Biped Walking Robot Based on ZMP Stability Criterion," *Proceedings of the IEEE/RSJ International Conference on Intelligent Robots and Systems*, vol. 1, Raleigh, N.C., Jul. 1992, pp. 597-603.

Lin, B-S. et al., "Dynamic Modeling, Stability and Energy Efficiency of a Quadrupedal Walking Machine," *Proceedings of the IEEE International Conference on Robotics & Automation (ICRA)*, 1993, Atlanta, GA, pp. 367-373.

Lynch, K. M. et al., "Dynamic Nonprehensile Manipulation: Controllability, Planning, and Experiments," *The International Journal of Robotics Research*, vol. 18, No. 1, Jan. 1999, pp. 64-92.

Orin, D., "Interactive Control of a Six-Legged Vehicle with Optimization of Both Stability and Energy," Ph.D. Dissertation, The Ohio State University, 1976.

Perry, J., "Chapter 3: Basic Functions," *Gait Analysis: Normal and Pathological Function*, Slack Inc., Thorofare, N.J., 1992, pp. 19-47.

Popovic, M. et al., "Angular Momentum Primitives for Human Walking: Biomechanics and Control," Proceedings of the *IEEE/RSJ International Conference on Intelligent Robots and Systems*, Japan, 2004, pp. 1685-1691.

Popovic, M. et al., "Angular Momentum Regulation During Human Walking: Biomechanics and Control," *Proceedings of the IEEE International Conference on Robotics & Automation (ICRA)*, New Orleans, LA, 2004, pp. 2405-2411.

Popovic, M. et al., "Conservation of Angular Momentum During Human Locomotion," Artificial Intelligence Laboratory Research Abstracts, Sep. 2002, pp. 264-265.

Popovic, M. et al., "Global Motion Control and Support Base Planning," *Proceedings of the International Conference on Intelligent Robots and Systems*.

Popovic, M. et al., "Ground Reference Points in Legged Locomotion: Definitions, Biological Trajectories and Control Implications," *International Journal of Robotics Research*, (Submitted).

Popovic, M. et al., "Zero Spin Angular Momentum Control: Definition and Applicability," Proceedings of the *IEEE-RAS/RSJ International Conference on Humanoid Robots*, Santa Monica, CA.

Sano, A. et al., "Control of Torque Distribution for the BLR-G2 Biped Robot," *Proceedings of the Int. Conf. on Advanced Robotics (ICAR)*, 1991, pp. 729-734.

Shih, C-L, "The Dynamics and Control of a Biped Walking Robot with Seven Degrees of Freedom," *Transactions of the ASME: Journal of Dynamic Systems, Measurement, and Control*, vol. 118, Dec. 1996, pp. 683-690.

Sian, N. E. et al., "Whole Body Teleoperation of a Humanoid Robot—A Method of Integrating Operator's Intention and Robot's Autonomy," *Proceedings of the IEEE International Conference on Robotics & Automation (ICRA)*, Taiwan, 2003, pp. 1613-1619.

Silva, F.M. et al., "Goal-Oriented Biped Walking Based on Force Interaction Control," *Proceedings of the IEEE International Conference on Robotics & Automation (ICRA)*, Korea, 2001, pp. 4122-4127.

Sugihara, T. et al., "Realtime Humanoid Motion Generation Through ZMP Manipulation Based on Inverted Pendulum Control," *Proceedings of the IEEE International Conference on Robotics & Automation (ICRA)*, Washington, D.C., 2002, pp. 1404-1409.

Sugihara, T. et al., "Whole-body Cooperative COG Control Through ZMP Manipulation for Humanoid Robots," *Proceedings of the 2nd Int. Symp. on Adaptive Motion of Animals and Machines*, Japan, 2003.

Takanishi, A. et al., "Realization of Dynamic Biped Walking Stabilized by Trunk Motion on a Sagittally Uneven Surface," *Proceedings of the IEEE International Workshop on Intelligent Robots and Systems*, 1990, pp. 323-330.

Vukobratović, M. et al., "On the Stability of Biped Locomotion," *IEEE Transactions on Bio-medical Engineering*, vol. BME-17, No. 1, Jan. 1970, pp. 25-36.

Vukobratović, M. et al., *Biped Locomotion: Dynamics, Stability, Control and Application (Scientific Fundamentals of Robotics 7)*, Springer-Verlag, Germany, 1990, pp. 1-3 and 309-312.

Vukobratović, M., "How to Control Artificial Anthropomorphic Systems," *IEEE Transactions on Systems, Man, and Cybernetics*, vol. SMC-3, No. 5, 1973, pp. 497-507.

Yamada, M. et al., "Dynamic Control of Walking Robot with Kick-Action," *Proceedings of the Int. Conf. on Advanced Robotics*, 1985, pp. 405-412.

Zatsiorsky, V. et al., "The Mass and Inertia Characteristics of the Main Segments of the Human Body," *International Series on Biomechanics, Volume 4B: Biomechanics VIII-B: Proceedings of the Eighth International Congress of Biomechanics*, Japan, 1983, pp. 1152-1159.

Zatsiorsky, V., *Kinetics of Human Motion*, 2002, pp. 12-19 and 583-613, Champaign, IL.

"Ground Reaction Force," [retrieved from the internet] retrieved on Mar. 28, 2005, <URL: http://kwon3d.com/theory/grf/grf.html>.

Biomechatronics Group, "Angular Momentum in Human Walking," [retrieved from the internet] retrieved on Jun. 23, 2005, <URL: http://biomech.media.mit.edu/research/pro1_3.htm>.

AMTI, "Calculations," [retrieved from the internet] retrieved on Mar. 28, 2005, <URL: http://www.amtiweb.com/calculations.htm>.

"Center of Pressure," [retrieved from the internet] retrieved on Mar. 28, 2005, <URL: http://kwon3d.com/theory/grf/cop.html>.

Hardt, M., et al., "Increasing Stability in Dynamic Gaits Using Numerical Optimization," Proceedings of the 15th IFAC World Congress on Automatic Control, Jul. 21-26, 2002, pp. 1636-1641, Barcelona, Spain.

Wong, T., et al., "Stabilization of Biped Dynamic Walking Using Gyroscopic Couple," IEEE International Joint Symposia, Nov. 4-5, 1996, pp. 102-108.

PCT International Search Report and Written Opinion, PCT/US05/10887, Nov. 6, 2006.

Kagami, S. et al., "Design and Implementation of Remotely Operation Interface for Humanoid Robot," Proceedings of the 2001 IEEE International Conference on Robotics and Automation, May 21-26, 2001, pp. 401-406, Seoul, Korea.

Kajita, S. et al., "Dynamic Walking Control of a Biped Robot Along a Potential Energy Conserving Orbit," IEEE Transactions on Robotics and Automation, Aug. 1992, vol. 8, No. 4, pp. 431-438.

Kuffner, J. et al., "Motion Planning for Humanoid Robots Under Obstacle and Dynamic Balance Constraints," Proc. 2001 IEEE International Conference on Robotics and Automation (ICRA 2001), 7 pages.

\* cited by examiner

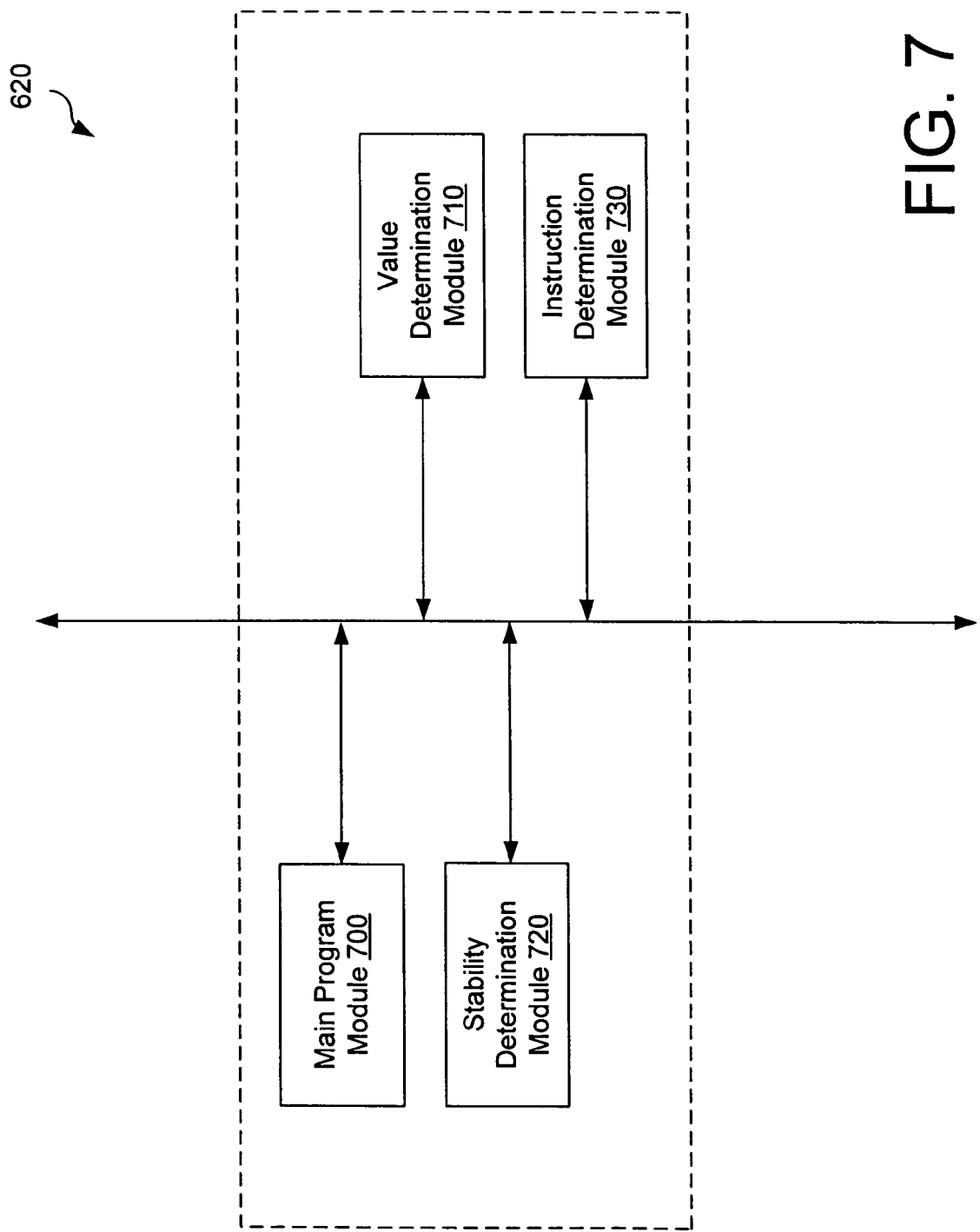

SYSTEMS AND METHODS FOR CONTROLLING A LEGGED ROBOT BASED ON RATE OF CHANGE OF ANGULAR MOMENTUM

CROSS-REFERENCE TO RELATED APPLICATION

This application claims priority from the following U.S. provisional patent application, which is hereby incorporated by reference: Ser. No. 60/558,367, filed on Mar. 31, 2004, entitled "Rate of Change of Angular Momentum and Balance Maintenance of Biped Robots."

BACKGROUND OF THE INVENTION

1. Field of the Invention

The present invention relates to controlling a legged robot so that the robot does not fall. More particularly, the present invention relates to controlling the robot based on the rate of change of the robot's angular momentum.

2. Description of Background Art

In order to engage in useful activities, a legged robot should be able to maintain its balance. The term "balance" generally refers to the preservation of overall rotational stability or equilibrium. If a robot's overall rotational equilibrium is lost, the robot can fall.

Control systems have been developed that instruct robots to take certain actions in an attempt to maintain or improve the robots' balance. A control system is usually based on a "stability criterion," which is a physical quantity that represents a robot's rotational equilibrium (or lack thereof). The value of the stability criterion varies based on the robot's state, and there is usually a range of values that indicate stability. If a robot's stability criterion does not fall within this goal range, the control system instructs the robot to take certain actions. These actions are meant to change the robot's state such that the value of the stability criterion approaches (or reaches) the goal range. By continuously monitoring the stability criterion, the controller can cause the robot to maintain or improve its stability over time.

One type of stability criterion is a point on the support surface (e.g., the ground) on which the robot is standing. One such point is the center of pressure (CoP). The CoP is the point of application of the resultant ground reaction force (GRF) underneath the robot's feet. Thus, the CoP exists as long as the robot is not airborne, since at least one of its feet is touching the ground at all times. The location of the CoP can be experimentally measured. In order for the robot to be stable, the CoP should be located within the robot's support polygon and, ideally, at the most central location within the polygon.

In robotics literature, the CoP is sometimes referred to as the zero moment point (ZMP). This literature provides a means to analytically compute (rather than experimentally measure) the location of the CoP/ZMP. The location of the CoP/ZMP is not well-defined when the support surface is non-planar. Although the location of the CoP/ZMP can quantify the stability of a relatively stable robot, it cannot do so for an unstable robot. This is because, in certain cases, the same CoP/ZMP location can correspond to several different states of a robot, and these states can have varying effects on the robot's stability.

Another such point is the foot-rotation indicator (FRI) point. The FRI point is related to the phenomenon of foot rotation and is applicable only during the single support phase of a biped. While, by definition, the CoP cannot leave the support polygon, the FRI point can. When the FRI point is located outside the support polygon, the distance between the FRI point and the support polygon is proportional to the amount of instability. The location of the FRI point is undefined when more than one foot is touching the ground.

What is needed are a stability criterion that overcomes the disadvantages of the previous criteria and a control technique that uses the criterion to maintain or improve a robot's balance.

SUMMARY OF THE INVENTION

Systems and methods are presented that use the rate of change of a legged robot's centroidal angular momentum ($\dot{H}_G$) in order to maintain or improve the robot's balance. In one embodiment, a control system determines the current value of $\dot{H}_G$, compares this value to a threshold value, and determines an instruction to send to the robot. Executing the instruction causes the robot to remain stable or become more stable.

In one embodiment, the current value of $\dot{H}_G$ is determined based on the expression GP×R, where G represents the location of the center of mass of the robot, R represents the resultant ground reaction force (GRF) acting upon the robot, P represents the location of the center of pressure of the resultant GRF, GP represents the vector from G to P, and × represents the vector product operation.

In another embodiment, the robot contains a plurality of segments, and the current value of $\dot{H}_G$ is determined based on the expression $$\sum_{1}^{n} \dot{H}_{Gi},$$

where $\dot{H}_{Gi}$ represents the rate of change of centroidal angular momentum of segment i, and n represents the number of segments contained in the robot.

Several different types of instructions can be sent to the robot. Generally, these instructions cause the robot to change its body position by activating one or more motors. These motors control, for example, the angles of joints between two adjoining segments. A robot can maintain or improve its balance using various strategies. In one embodiment, each strategy attempts to make $\dot{H}_G$ equal zero in a different way. One strategy is to modify the robot's support polygon so that it encompasses the Zero Rate of change of Angular Momentum (ZRAM) point. Another strategy is to move G with respect to P so that R passes through G in its new location G'. Yet another strategy is to change the GRF direction by changing the translational acceleration of the centroid from a to a'.

Systems and methods are also presented that use a value derived from $\dot{H}_G$ in order to maintain or improve the robot's balance. In one embodiment, a control system determines the location of the ZRAM point (A), determines the distance between A and P, compares this value to a threshold value, and determines an instruction to send to the robot. Executing the instruction causes the robot to remain stable or become more stable.

BRIEF DESCRIPTION OF THE DRAWINGS

The invention is illustrated by way of example, and not by way of limitation, in the figures of the accompanying drawings in which like reference numerals refer to similar elements.

FIG. 7 illustrates a more detailed block diagram of the contents of the memory unit in FIG. 6.

DETAILED DESCRIPTION OF THE EMBODIMENTS

Figures 1A, 1B:
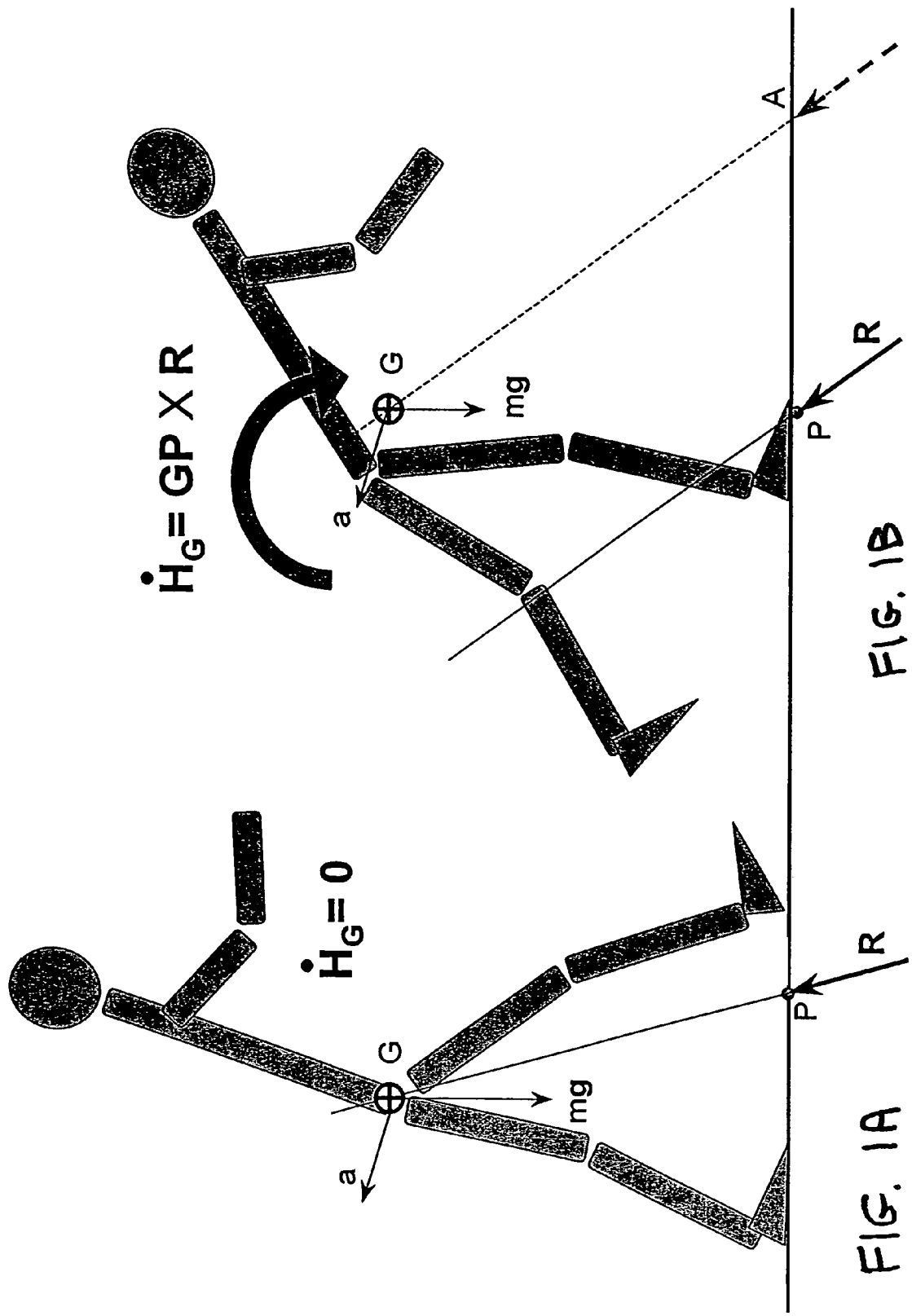
FIG. 1A illustrates a diagram of a robot that possesses rotational equilibrium, according to one embodiment of the invention.
FIG. 1B illustrates a diagram of a robot that does not possess rotational equilibrium, according to one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

1. Rate of Change of Angular Momentum

As discussed above, the term "balance" generally refers to the preservation of overall rotational equilibrium. One way to measure a body's rotation (such as a robot's rotation) is to determine its overall angular position over time. If the angular position changes over time (i.e., if the robot has an angular velocity), then the robot is rotating. While the angular position can be measured relative to any line, in one embodiment, it is measured relative to the gravity line passing through the robot's center of mass (CoM).

When a body (such as a robot) has an overall angular speed, it is tipping over, which causes either spinning (such as in gymnastics, figure skating, or diving) or falling. A body with any non-zero angular speed or angular momentum can fall, even if the body's current angular speed or angular momentum is constant. What causes a fall is a change in angular speed or angular momentum. Hence, a rate of change of angular speed or angular momentum corresponds to a loss of rotational equilibrium.

Newton's second law of motion states that a body's translational (linear) acceleration is determined by the sum of the forces acting upon the body. Similarly, the Newton-Euler equation states that a body's rotational acceleration is determined by the sum of the torques (also called "moments") acting upon the body. This sum is also known as the "resultant external torque" or "resultant external moment." If the resultant external moment on the body (measured relative to the body's CoM) equals zero, then overall rate of change of angular momentum equals zero, and overall rotational stability or equilibrium has been achieved. A moment can arise from any force, such as gravity, contact or interaction with an object (such as, e.g., the ground or an object that is being held), or an unexpected disturbance (such as, e.g., a slippery surface like a floor or an immovable object like a wall). The force can be either a "pure" rotational force or a force with a linear component.

The resultant external moment on a body equals the rate of change of the body's angular momentum. If the resultant external moment is defined relative to the body's CoM (also known as its centroid), then the angular momentum is known as the centroidal angular momentum. If G denotes the body's centroid (CoM), and $H_G$ denotes the body's centroidal angular momentum, then $\dot{H}_G$ denotes the rate of change of the body's centroidal angular momentum. Thus, if $\dot{H}_G$ equals zero, then overall rotational stability or equilibrium has been achieved.

FIGS. 1A and 1B illustrate diagrams of robots, according to two embodiments of the invention. In each illustrated embodiment, the following conditions are present: 1) the feet of the robot are posed on the same horizontal plane; 2) the robot is interacting with its environment only through its feet (in other words, forces and moments are applied to the robot only at its feet); and 3) the vertical components of these moments do not contribute to rotational instability. These conditions cause the resultant external moment on the robot (measured relative to its CoM) to manifest itself as the resultant ground reaction force (denoted by vector R), which acts at the center of pressure (denoted by point P). Due to the unilaterality of the ground reaction force (GRF), P is always located within the convex hull of the foot support area. In the illustrated embodiments, point G denotes the location of the robot's centroid or center of mass, m denotes the mass of the robot, and vector g denotes the gravity acceleration vector.

If moments are taken about the robot's CoM (G), then $$\dot{H}_G = GP \times R, \quad (1)$$

where GP denotes a vector from point G to point P and × denotes the vector product operation. Thus, Equation 1 provides a way to determine $\dot{H}_G$ given the values of G, P, and R when the previously-mentioned conditions are present and when moments are taken about G. Other equations that can be used to determine $\dot{H}_G$ will be discussed below. These equations can be useful when, for example, the previously-mentioned conditions are not present and/or moments are not taken about G.

Recall that G denotes the robot's center of mass (CoM), also known as its centroid. One way to determine G is to "decompose" the robot into n segments. The mass of each segment, along with the location of its center of mass, can be used to determine G as follows. If $m_i$ represents the mass of segment i, and $r_i$ is a vector that represents the location of segment i's center of mass, then $$G = \frac{\sum_{i=1}^{n} m_i r_i}{\sum_{i=1}^{n} m_i}, \quad (2)$$

where G is a vector that represents location G.

For each segment i, $m_i$ and $r_i$ can be determined as follows: $m_i$, which is one of the robot's design parameters, is provided by the robot's manufacturer, usually in the form of a computer-aided design (CAD) model. $r_i$ is based on the location of the segment's center of mass relative to the segment's coordinate system and the location of the segment relative to the global coordinate system. The robot's manufacturer provides the location of the segment's center of mass relative to the segment's coordinate system. The initial location of a segment relative to the global coordinate system is measured or determined based on locations of segments proximate to the segment.

A robot made of segments can exist in many different positions based on the angles between adjoining segments. These angles can be determined, for example, by using a position encoder at the joint to measure the angle between each pair of adjoining segments. If the size of each segment is known, then the location of any segment can be determined based on joint angles and the location of one point of the robot body (for example, a point on the robot's foot or pelvis). The robot manufacturer provides the size of each segment. The location of the point is determined, for example, by physically measuring the robot relative to an inertial reference point O. O represents the origin of the coordinate system and can be selected at will.

Recall that R denotes the resultant ground reaction force (GRF), and P denotes the center of pressure (CoP), or point of action, of the GRF. One way to determine the GRF is by using a force-plate, such as is available from Advanced Mechanical Technology, Inc. (AMTI) of Watertown, Mass. The interaction between a legged robot and the ground is through the robot's foot (or feet). A force-plate usually has multiple force sensors embedded in it (e.g., one sensor at each corner of the plate). Each sensor is tri-axial, which means that it measures the forces acting between the foot and the ground in three axes: transverse (X), anteroposterior (Y), and vertical (Z). The sum of all the reactions from the ground (the GRF) is equivalent to the sum of the forces measured by the sensors. P can be determined based on the GRF, the origin (center) of the plate, and the moment caused by the GRF around the origin. The origin is provided in the plate's calibration data sheet, and the other values are provided by the plate itself.

FIG. 1A illustrates a diagram of a robot that possesses rotational equilibrium, according to one embodiment of the invention. Note that all forces acting on the robot, namely, vector R and vector g, pass through point G. Thus, their moments (measured relative to G) are equal to zero. Since the resultant external moment equals zero, $\dot{H}_G$ equals zero, and overall rotational equilibrium is maintained.

FIG. 1B illustrates a diagram of a robot that does not possess rotational equilibrium, according to one embodiment of the invention. In the illustrated embodiment, vector R, which represents the GRF, does not pass through point G. Thus, its moment (measured relative to G) is non-zero. Since the only other force acting on the robot (namely, gravity) does pass through G (by definition), and thus has a zero moment, the resultant external moment is non-zero. Thus, $\dot{H}_G$ is non-zero, and overall rotational equilibrium has not been achieved. Specifically, $\dot{H}_G$ equals GP×R. (In FIG. 1A, $\dot{H}_G$ also equaled GP×R, but since GP and R were antiparallel, GP×R equaled zero.) In FIG. 1B, the non-zero value of GP×R indicates that the robot has a net clockwise moment around G. Thus, the robot will have a tendency to tip over forwards.

Note that GP×R=0 implies that GP is parallel to R. GP can be made parallel to R in various ways for a particular robot, as will be discussed below. Consider an imaginary shift of the line of action of R (the GRF) in order to geometrically satisfy GP×R=0. If the GRF were shifted laterally to act along a different line of action (specifically, one that passed through G), GP and R would be antiparallel, so GP×R would equal zero. Thus, $\dot{H}_G$ would equal zero, and the robot would be rotationally stable.

This is depicted in FIG. 1B, where A is the point of intersection of the ground and the shifted (imaginary) GRF. In other words, A is the location of the (imaginary) center of pressure of a GRF that has been laterally shifted so that its line of action passes through G and, as a result, $\dot{H}_G$ equals zero. Since shifting the GRF to intersect the ground at A results in $\dot{H}_G$ equaling zero, A is referred to as the Zero Rate of change of Angular Momentum (ZRAM) point.

The amount of lateral shift of the GRF is equal to PA (the distance from P to A), since P represents the intersection of the ground and the actual GRF, and A represents the intersection of the ground and the shifted GRF. When PA equals zero (i.e., when A is located in the same place as P), then the actual GRF's line of action already passes through G, and the robot is in rotational equilibrium. When PA is non-zero, then the actual GRF's line of action does not pass through G, and the robot is rotationally unstable.

Figure 2A:
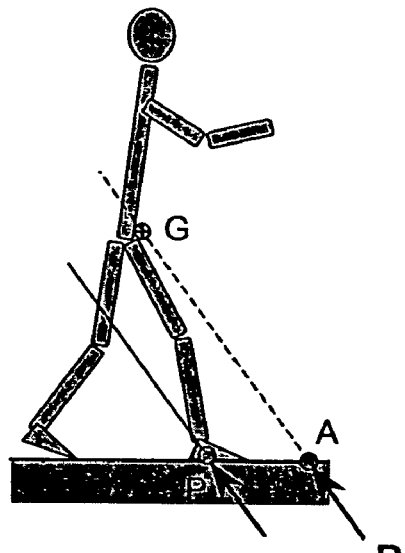
FIG. 2A illustrates a diagram of a robot that schematically depicts the location of the ZRAM point for a level ground geometry.
Figure 2B:
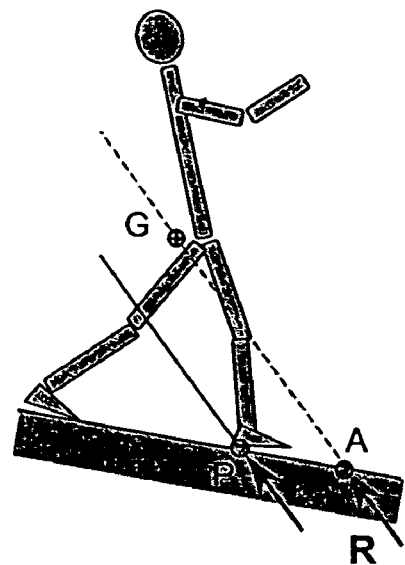
FIG. 2B illustrates a diagram of a robot that schematically depicts the location of the ZRAM point for an inclined ground geometry.
Figure 2C:
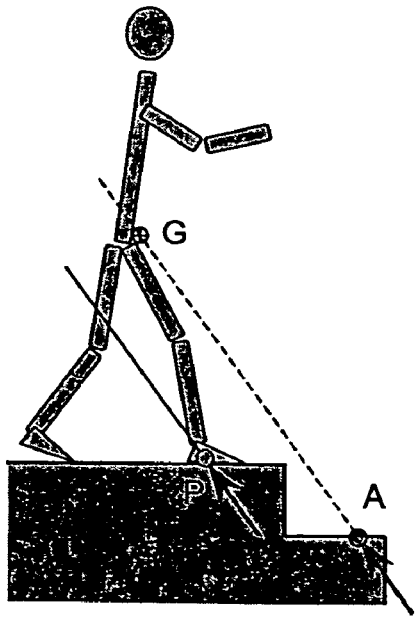
FIG. 2C illustrates a diagram of a robot that schematically depicts the location of the ZRAM point for a stairstep ground geometry.
Figure 2D:
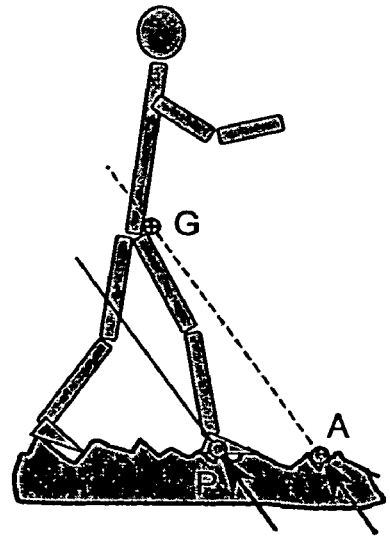
FIG. 2D illustrates a diagram of a robot that schematically depicts the location of the ZRAM point for an uneven ground geometry.

The location of the ZRAM point can be determined by projecting the robot's CoM along the GRF. The actual position of the ZRAM point depends on the geometry of the ground. FIGS. 2A-2D schematically depict the location of the ZRAM point for four different situations. FIG. 2A illustrates a diagram of a robot that schematically depicts the location of the ZRAM point for a level ground geometry. FIG. 2B illustrates a diagram of a robot that schematically depicts the location of the ZRAM point for an inclined ground geometry. FIG. 2C illustrates a diagram of a robot that schematically depicts the location of the ZRAM point for a stairstep ground geometry. FIG. 2D illustrates a diagram of a robot that schematically depicts the location of the ZRAM point for an uneven ground geometry. As before, G denotes the robot's center of mass, R denotes the ground resultant force (GRF), P denotes the center of pressure of the GRF, and A denotes the ZRAM point. Note that shifting the GRF line of action causes the ground to be intercepted at a different point, and this point might not lie within the convex hull of the foot support area.

Recall that $\dot{H}_G = GP \times R$ when the feet of the robot are posed on the same horizontal plane, the robot is subjected to moments only at its feet, the vertical components of these moments do not contribute to rotational instability, and moments are taken about G. Other equations can also be used to determine $\dot{H}_G$.

$\dot{H}_G$, the rate of change of centroidal angular momentum of a robot, equals the sum of the rates of change of centroidal angular momentum of each segment of the robot. In other words, for a robot made of n segments, $$\dot{H}_G = \sum_1^n \dot{H}_{Gi}.$$

Since the rate of change of centroidal angular momentum of an object (such as a segment of a robot) is equal to the sum of the moments acting upon the body, $\dot{H}_{Gi} = \Sigma$(moments acting on segment i). If the moments are grouped according to their components, then we have the following expression:

$\dot{H}_{Gi} = \Sigma$(moments acting on segment $i$) = $\Sigma$(moments from forces' rotational components+moments from forces' linear components) = $\Sigma$(moments from forces' rotational components)+$\Sigma$(moments from forces' linear components).

If a linear force component F is applied to a segment at a point (whose position is defined by the vector r), then the moment arising from the force is equal to the vector product of r and F (i.e., r×F). If F is not known, it can be determined according to Newton's second law of motion: F=ma, where m is the mass of the segment, and a is the linear acceleration of the segment. If the segment is rotating, then the linear acceleration a is equal to the product of a (the angular acceleration) and l (the length of the moment arm). If the segment is treated as a particle existing at its center of mass (G), and O represents the origin of the coordinate system, then r is equal to the vector OG. Thus, a moment arising from a linear force component equals $r \times F = r \times (ma) = OG \times (ma) = OG \times (mla)$ If a torque is applied to a segment then, regardless of its location, the moment arising from the torque is equal to the product of I and a, where I is the moment of inertia at G, and a is the angular acceleration at G. Thus, a moment arising from a rotational force component equals Ia.

Using these equations, we now have $$\dot{H}_{Gi} = OG_i \times (m_i l_i a_i) + I_i a_i. \quad (3)$$

The robot's design parameters determine the values of $m_i$, $l_i$, $G_i$, and $I_i$, and these values are provided by the manufacturer of the robot. $a_i$ can be determined by using an accelerometer placed at the center of mass. Alternatively, $a_i$ can be determined by using position encoders at joints. Since a position encoder can be used to measure a joint angle position, taking these measurements over time and taking the first derivative and the second derivative yields the joint angle velocity and joint angle acceleration, respectively. O represents the origin of the coordinate system and can be selected at will.

Figure 3:
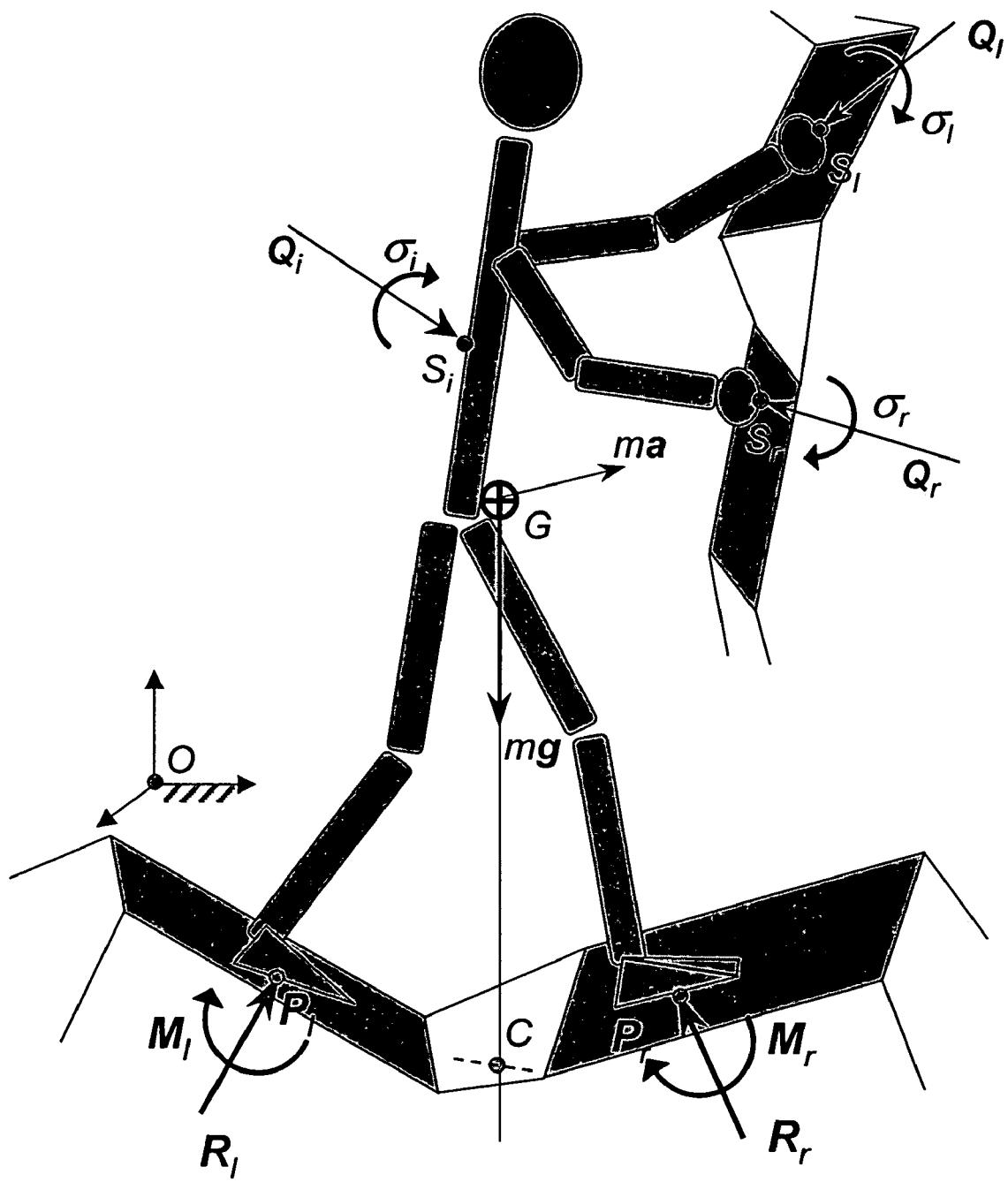
FIG. 3 illustrates a diagram of a robot being acted upon by forces and moments caused by the ground and the environment, according to one embodiment of the invention.

The expression $OG_i \times (m_i l_i a_i) + I_i a_i$ uses measurements of a robot's state (such as its design parameters) to determine the value of $\dot{H}_{Gi}$. Alternatively, $\dot{H}_{Gi}$ can be determined based on forces and moments affecting the robot. FIG. 3 illustrates a diagram of a robot being acted upon by forces and moments caused by the ground and the environment, according to one embodiment of the invention. An arbitrary inertial (earth-fixed) coordinate frame is shown situated at O. The feet are posed on two different planar surfaces and are subjected to individual force/moment pairs from each surface: $R_l/M_l$ (left foot) and $R_r/M_r$ (right foot). Vectors $M_l$ and $M_r$ are normal to the respective support surfaces, which are oriented in a general way in the three-dimensional space. Consequently, each vector $M_l$ and $M_r$ has one non-zero component along its respective surface normal. $P_l$ and $P_r$ are the points of application of vectors $R_l$ and $R_r$, respectively. The robot interacts with the environment through its hands, which are similarly subjected to individual force/moment pairs: $Q_l/\sigma_l$ (left hand) and $Q_r/\sigma_r$ (right hand). Due to a hand's grasping capability, vectors $\sigma_l$ and $\sigma_r$ are not constrained to be normal to any surface.

Additionally, the robot is assumed to be engaged in realistic activities and subjected to any number of expected or unexpected interaction force/moment pairs $Q_i/\sigma_i$ from the environment. Without loss of generality, it can be assumed that there are j forces $Q_i$ and k moments $\sigma_i$ acting at arbitrarily different points on the robot body. $S_i$ is the point of application of vector $Q_i$. Moments are free vectors, and their application points are irrelevant for system dynamics. G denotes the robot's center of mass (CoM), and C denotes the ground projection of the center of mass (GCoM). In the illustrated embodiment, the locations of the center of pressure (CoP) and the foot-rotation indicator (FRI) point are not well-defined.

The equation for translational dynamic equilibrium can be written as:

$$R_l + R_r + \sum_{i=1}^{n} m_i g + \sum_{i=1}^{j} Q_i = \sum_{i=1}^{n} m_i a_i \quad (4)$$

which can be reduced to $$R + mg + Q = ma \quad (5)$$

where $$R = R_l + R_r, \; m = \sum_{i=1}^{n} m_i$$

is the total mass of the robot (located at the center of mass, CoM) which has n segments, $$Q = \sum_{i=1}^{j} Q_i$$

is the resultant of all the external non-ground forces, and a is the acceleration of the CoM.

Recall that the resultant external moment on a body (measured relative to its CoM) equals the rate of change of the body's centroidal angular momentum. If the point G denotes the location of the robot's CoM, then any force acting on the robot that passes through G has a moment (measured relative to G) that equals zero. Equation 4 can be solved for the magnitude and direction of R but not the location of its line of action. Thus, from Equation 4 alone, it cannot be determined whether R passes through G. In order to determine that, the moment equation should be solved.

The moment equation should be formulated either at the robot's CoM (G) or at any inertial reference point. Taking moments about an arbitrary inertial point O, we have $$M_l + M_r + OP_l \times R_l + OP_r \times R_r + \sum_{i=1}^{k} \sigma_i + \sum_{i=1}^{j} OS_i \times Q_i + \quad (6)$$

$$\sum_{i=1}^{n} OG_i \times m_i g = \sum_{i=1}^{n} \dot{H}_o = \sum_{i=1}^{n} \dot{H}_{Gi} + \sum_{i=1}^{n} OG_i \times m_i a_i$$

where $\dot{H}_{Gi}$ is the rate of change of the centroidal angular momentum of the $i^{th}$ segment.

Equation 6 can be reduced to $$M + OP_l \times R_l + OP_r \times R_r + \sigma + \sum_{i=1}^{j} OS_i \times Q_i + OG \times mg = \quad (7)$$

$$\dot{H}_G + OG \times ma \text{ where}$$

$$M = M_l + M_r, \; \sigma = \sum_{i=1}^{k} \sigma_i, \; m = \sum_{i=1}^{n} m_i, \text{ and}$$

$$\dot{H}_G = \sum \dot{H}_{Gi} + \sum GG_i \times m_i a_i. \text{ Thus,}$$

Equation 7 provides a way to determine $\dot{H}_G$ given the values of M, O, $P_l$, $R_l$, $P_r$, $R_r$, σ, m, $S_i$, $Q_i$, G, and a. (g is the force of gravity, which is always 9.8 m/s² on Earth.)

If the robot's body is equipped with pressure-sensitive "skin," then σ, $S_i$, and $Q_i$ can be determined directly. Alternatively, they can be determined indirectly by measuring spikes in joint torque and determining the difference between expected torque values and actual torque values. m, G, and a can be determined based on the robot's design parameters, as described above in conjunction with Equation 3. O represents the origin of the coordinate system and can be selected at will. The remaining variables are M, $P_l$, $R_l$, $P_r$, $R_r$. If the robot is located on a force-plate, the plate can determine these values. Alternatively, these values can be determined using force sensors or pressure sensors placed under the robot's feet.

If moments are taken about the CoM (in other words, if O is replaced with G), Equation 7 simplifies to $$M + GP_l \times R_l + GP_r \times R_r + \sigma + \sum_{i=1}^{j} GS_i \times Q_i = \dot{H}_G \quad (8)$$

In this situation, the terms OG×mg and OG×ma from Equation 7 equal zero and thus are not present in Equation 8. Thus, Equation 8 provides a way to determine $\dot{H}_G$ given the values of M, G, $P_l$, $R_l$, $P_r$, $R_r$, σ, m, $S_i$, and $Q_i$ when moments are taken about the CoM (G).

Sometimes, σ=0, $Q_i$=0, the feet are posed on the same horizontal plane, and M has a non-zero vertical component that does not contribute to rotational instability. Under these conditions, R=$R_l$+$R_r$ is the resultant ground reaction force (GRF) passing through P, and Equation 7 reduces to $$OP \times R + OG \times mg = \dot{H}_o = \dot{H}_G + OG \times ma \quad (9)$$

Thus, Equation 9 provides a way to determine $\dot{H}_G$ given the values of O, P, R, G, m, and a when the previously-mentioned conditions are present.

If the moments are taken about G, then Equation 9 simplifies to $$GP \times R = \dot{H}_G \quad (1)$$

where GP denotes a vector from point G to point P and × denotes the vector product operation. Thus, Equation 1 provides a way to determine $\dot{H}_G$ given the values of G, P, and R when the previously-mentioned conditions are present and when moments are taken about G.

2. Overview of Technique for Controlling a Legged Robot Based on Rate of Change of Angular Momentum In one embodiment, a robot control system uses $\dot{H}_G$ as a balance maintenance criterion where balance is viewed as strongly related to rotational equilibrium. The value of $\dot{H}_G$ is determined, and the control system maintains (or improves) the robot's balance by instructing the robot, based on this value, to perform a particular action.

Figure 4:
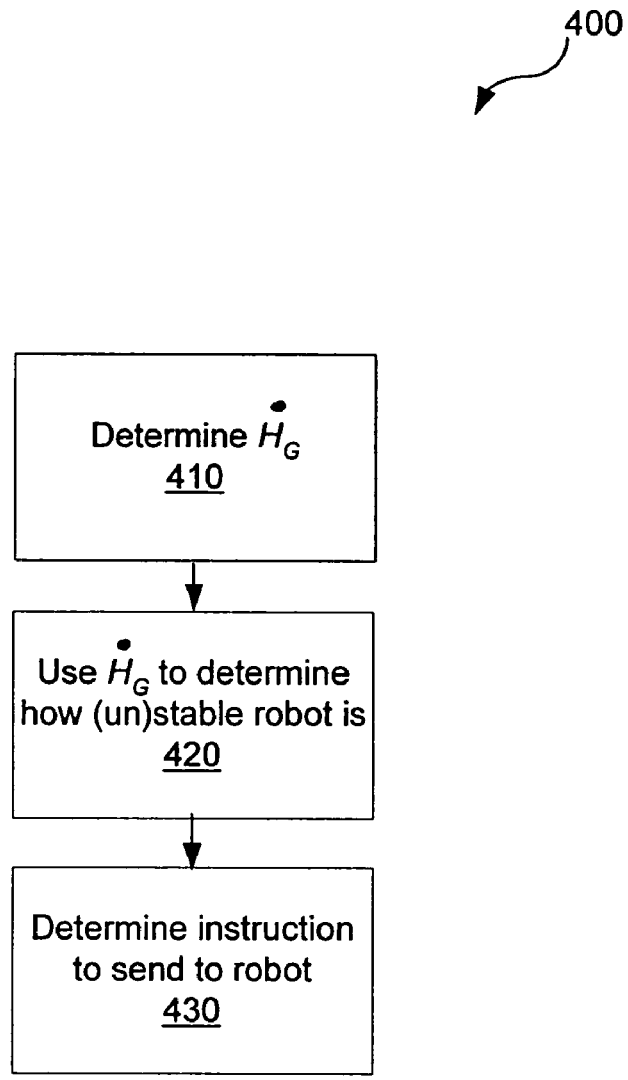
FIG. 4 illustrates a flowchart of a method for controlling a legged robot based on rate of change of angular momentum, according to one embodiment of the invention.

FIG. 4 illustrates a flowchart of a method for controlling a legged robot based on rate of change of angular momentum, according to one embodiment of the invention. In the first step of method 400, the current stability (or instability) of the robot is determined 410. In one embodiment (shown), determining 410 the current stability (or instability) of the robot comprises determining the current value of $\dot{H}_G$. This value can be determined by using any one of Equations 1, 3, 6, 7, 8, or 9 as discussed above.

After the current stability (or instability) of the robot has been determined 410, this value is used to determine 420 how stable (or unstable) the robot is. In one embodiment, a robot is "stable" (i.e., it possesses a more favorable state of balance) if its current value of $\dot{H}_G$ equals zero. In this embodiment, the absolute value of $\dot{H}_G$ reflects how stable the robot is, where a smaller absolute value reflects a more stable robot, and a larger absolute value reflects a less stable robot.

A control system determines 430, based on how stable (or unstable) the robot is, an instruction to send to the robot. In one embodiment, this determination is based on the absolute value of $\dot{H}_G$. When the robot executes the instruction, the robot will remain stable or become more stable. In one embodiment, executing the instruction causes the absolute value of $\dot{H}_G$ to decrease.

In one embodiment, the absolute value of $\dot{H}_G$ is compared to a threshold value, which denotes a range of "stable" operation. A control system can use any one of several threshold values. Which value is best suited to a particular situation depends on many factors, such as the friction between a foot and the ground, the torque limits of robot's actuators, the robot's design parameters, and the robot's inertial properties.

In one embodiment, human motion data is used to determine a stability range for $\dot{H}_G$. For a given task, such as walking, human subjects perform the task, biomechanical data is collected, and the values of $\dot{H}_G$ are determined. The range of $\dot{H}_G$ values obtained from a group of human subjects exhibiting normal gait is then used as the "stable" range. Some of the values may need to be scaled if the robot and the human subjects have different physical dimensions.

In order to determine the values of $\dot{H}_G$, additional data is needed about the subjects, such as their geometry and inertial properties. This data can be measured or estimated. Several publications contain this type of data. These publications include "Anthropometry of Body Action" by W. T. Dempster, Annals of the New York Academy of Sciences, vol. 63, pp. 559-585 (1956), and "The Mass and Inertia Characteristics of the Main Segments of the Human Body" by V. Zatsiorsky and V. Seluyanov, Biomechanics VIII-B, vol. 8, pp. 1152-1159 (1983).

Several different types of instructions can be sent to the robot. Generally, these instructions cause the robot to change its body position by activating one or more motors. These motors control, for example, the angles of joints between two adjoining segments. The instruction can specify, for example, a desired joint angle position and the velocity and acceleration that should be used to achieve it. A robot can also perform complex movements, such as taking a step, sitting down, and grabbing a support. These complex movements are achieved by sending instructions to multiple motors.

A robot can maintain or improve its balance using various strategies. In one embodiment, each strategy attempts to make $\dot{H}_G$ equal zero in a different way. One strategy is to modify the robot's support polygon so that it encompasses the ZRAM point (A). Another strategy is to move G with respect to P so that R passes through G in its new location G'. Yet another strategy is to change the GRF direction by changing the translational acceleration of the centroid from a to a'.

Figure 5:
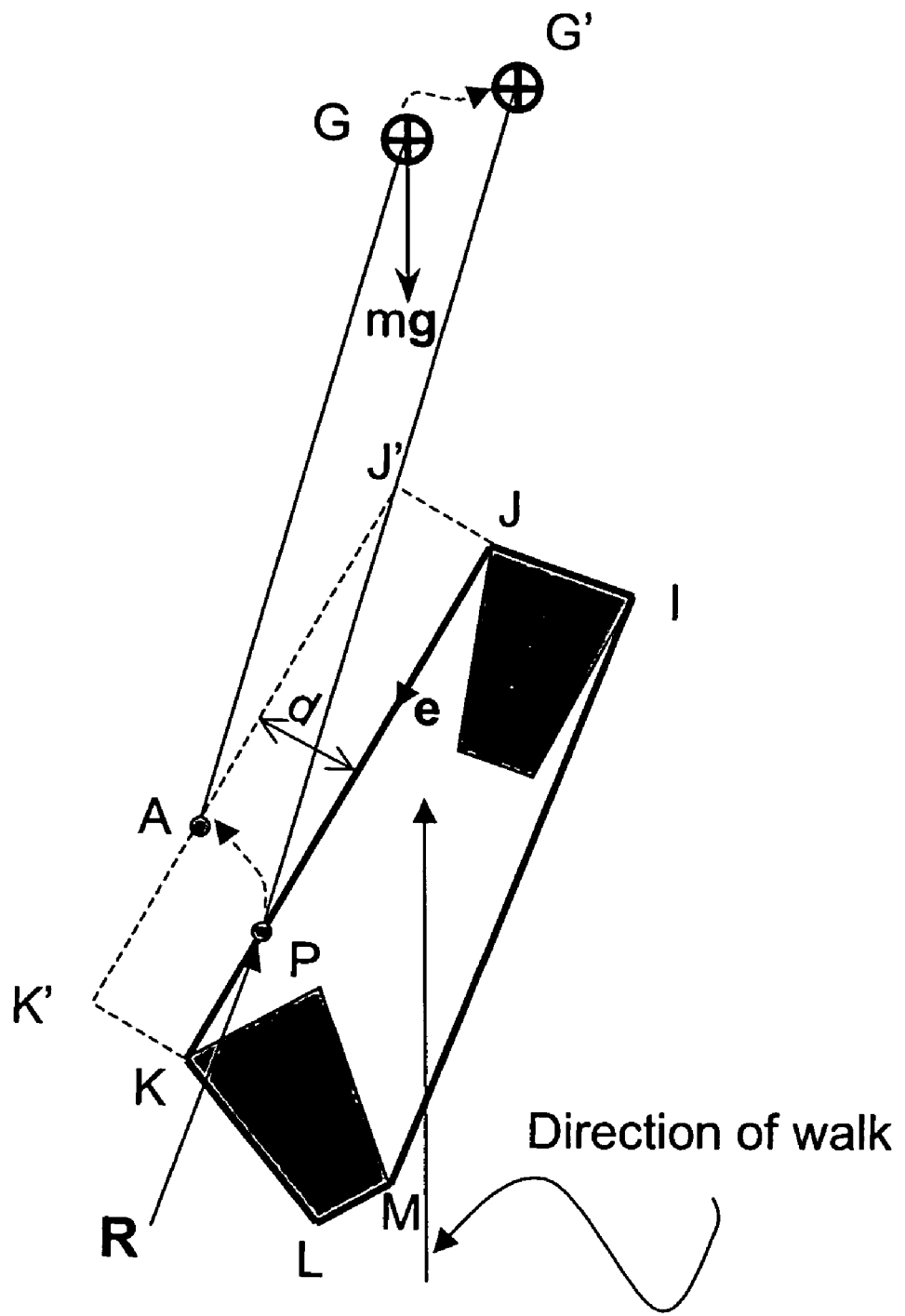
FIG. 5 illustrates an aerial view of a support polygon and a ZRAM point, according to one embodiment of the invention.

Enlarge support polygon—If a robot is unstable, its ZRAM point (A) is located outside its support polygon. FIG. 5 illustrates an aerial view of a support polygon and a ZRAM point, according to one embodiment of the invention. The current support polygon is defined by the points I, J, K, L, and M. Note that A is located outside this polygon. Thus, the robot is currently unstable. Also, note that R (the GRF) does not pass through G.

The distance d between A and the nearest point of the support polygon is proportional to the instability of the robot. In other words, as d increases, the robot's instability increases. In the illustrated embodiment, the point of the support polygon nearest to A lies on the edge JK. In order for the support polygon to encompass A, edge JK should be shifted outward by an amount of d to a new position of J'K'. One way to shift this edge is to move a foot (e.g., take a step) at a distance d.

Notice that $$GJ'=GJ+d(k \times e), \quad (10)$$

where $$e = \frac{JK}{|JK|},$$

and k is a unit vector perpendicular to the plane of the support polygon (if the polygon is planar). If the support polygon is not planar, then k is a unit vector normal to the plane containing JK and J'K'. d can be expressed as:

$$d = \frac{-e \cdot [GJ \times R + \sigma]}{e \cdot [(k \times e) \times R]} \quad (11)$$

Move G—If Equation 9 is generalized to include interaction forces ($\sigma$ and Q), it can be rewritten as:

$$GP \times R + \sigma + \sum_{i=1}^{j} GS_i \times Q_i = \dot{H}_G \quad (12)$$

If a robot is unstable, R (the GRF) does not pass through G. Suppose that G moves to a new position G' so that $\dot{H}_G'$ equals zero. In other words, $$G'P \times R + \sigma + \sum_{i=1}^{j} G'S_i \times Q_i = \dot{H}_G' = 0. \quad (13)$$

Based on Equations 12 and 13, GP is set equal to GG'+G'P and $GS_i$ is set equal to $GG'+G'S_i$ to obtain:

$$GG' \times (R+Q) = \dot{H}_G. \quad (14)$$

Equation 14 is of the standard form A×B=C, where A=GG', B=(R+Q), and C=$\dot{H}_G$. Thus, Equation 14 can be solved for A (here, GG').

Change GRF direction—If R is set equal to ma−mg−Q, Equation 12 can be rewritten as:

$$GP \times (ma - mg - Q) + \sigma + \sum_{i=1}^{j} GS_i \times Q_i = \dot{H}_G \quad (15)$$

Suppose that $\dot{H}_G=0$ is obtained by changing ma to ma'. Equation 15 can be rewritten as:

$$GP \times (ma' - mg - Q) + \sigma + \sum_{i=1}^{j} GS_i \times Q_i = 0 \quad (16)$$

Based on Equations 15 and 16, the following is obtained:

$$GP \times ma' = GP \times ma - \dot{H}_G. \quad (17)$$

Equation 17 is of the standard form A×B=C, where A=GP, B=ma', and C=GP×ma−$\dot{H}_G$. Thus, Equation 17 can be solved for ma'.

A control system can use any one of several control laws when determining an instruction to send to the robot in order to maintain or improve its stability. These control laws can vary in their nature and/or sophistication. In one embodiment, a proportional integral (PI) control law on $\dot{H}_G$ is used. In this embodiment, the control system determines a particular joint torque in order to cause the value of $\dot{H}_G$ to approach (or reach) a goal range. The control system then generates an instruction; this instruction causes the robot to take an action that will result in the particular joint torque desired.

3. Overview of Technique for Controlling a Legged Robot Based on Value Derived from Rate of Change of Angular Momentum In another embodiment, rather than using $\dot{H}_G$ as a balance maintenance criterion, a robot control system uses a value derived from $\dot{H}_G$. For example, the control system could use A (the ZRAM point) or PA (the distance between P, the center of pressure of the actual GRF, and A) as a balance maintenance criterion. The value of the derived criterion is determined, and the control system maintains or improves the robot's balance by instructing the robot, based on this value, to perform a particular action.

In one embodiment (not shown), determining the current stability (or instability) of the robot comprises determining the location of the ZRAM point. After the current stability (or instability) of the robot has been determined, this value is used to determine how stable (or unstable) the robot is. In one embodiment, a robot is "stable" (i.e., it possesses a more favorable state of balance) if its current value of PA equals zero. In this embodiment, the absolute value of PA reflects how stable the robot is, where a smaller absolute value reflects a more stable robot, and a larger absolute value reflects a less stable robot.

Recall that PA represents the amount of lateral shift of the GRF that is necessary in order to make $\dot{H}_G$ equal zero. The larger the absolute value of PA, the larger the amount of moment on the robot's CoM, and the larger the value of $\dot{H}_G$. Conversely, as A gets closer to P, the amount of unbalanced moment at the CoM is reduced, and finally becomes zero as A (the ZRAM point) coincides with P.

A control system determines, based on how stable (or unstable) the robot is, an instruction to send to the robot. In one embodiment, this determination is based on the absolute value of PA. When the robot executes the instruction, the robot will become more stable. In one embodiment, executing the instruction causes the absolute value of PA to decrease.

In one embodiment, the absolute value of PA is compared to a threshold value, which denotes a range of "stable" operation.

Figure 6:
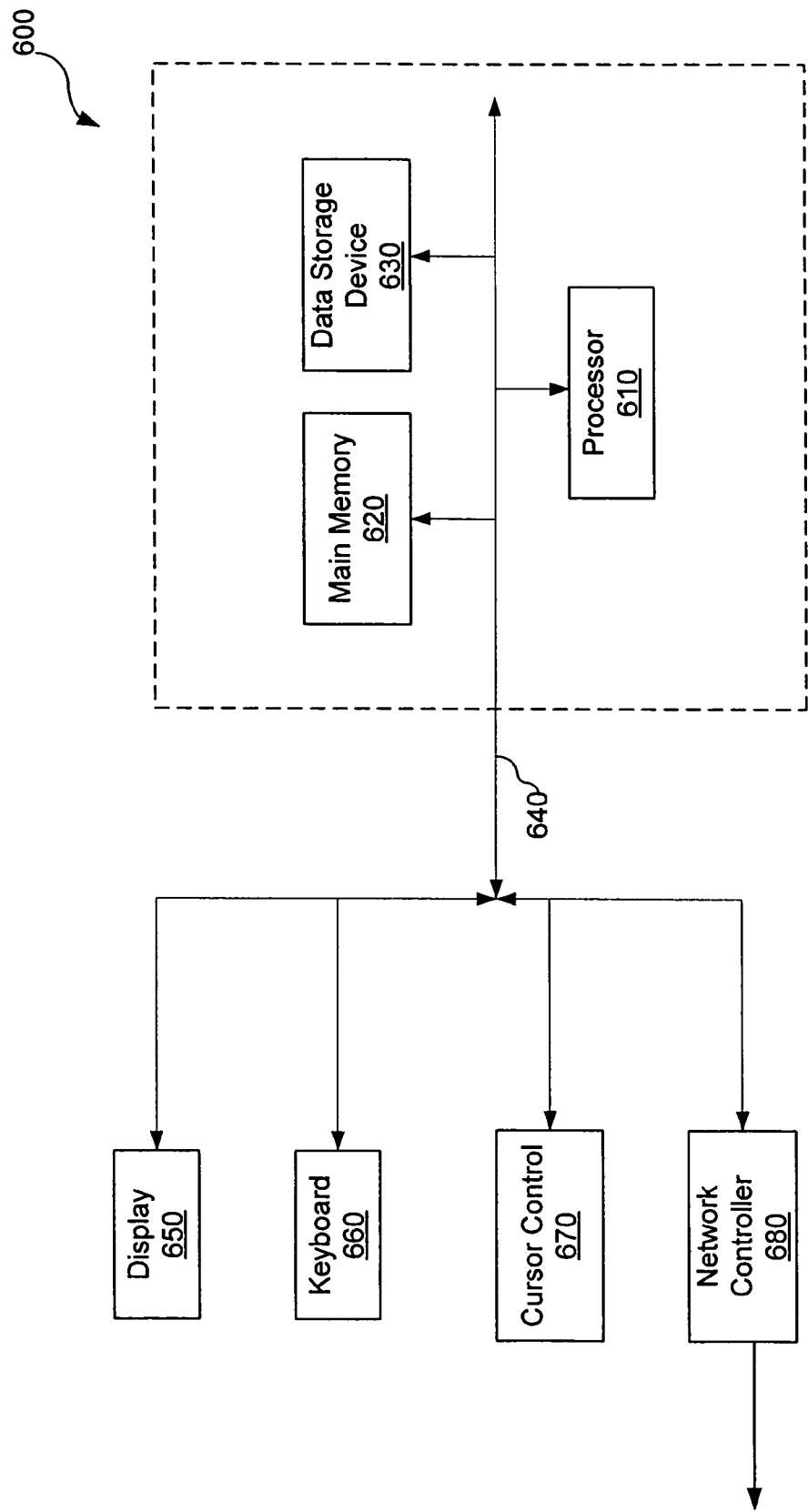
FIG. 6 illustrates a block diagram of an apparatus for controlling a legged robot based on rate of change of angular momentum, according to one embodiment of the invention.

4. Apparatus for Controlling a Legged Robot Based on Rate of Change of Angular Momentum FIG. 6 illustrates a block diagram of an apparatus for controlling a legged robot based on rate of change of angular momentum, according to one embodiment of the invention. Apparatus 600 preferably includes a processor 610, a main memory 620, a data storage device 630, and an input/output controller 680, all of which are communicatively coupled to a system bus 640. Apparatus 600 can be, for example, a general-purpose computer.

Processor 610 processes data signals and comprises various computing architectures including a complex instruction set computer (CISC) architecture, a reduced instruction set computer (RISC) architecture, or an architecture implementing a combination of instruction sets. Although only a single processor is shown in FIG. 6, multiple processors may be included.

Main memory 620 stores instructions and/or data that are executed by processor 610. The instructions and/or data comprise code for performing any and/or all of the techniques described herein. Main memory 620 is preferably a dynamic random access memory (DRAM) device, a static random access memory (SRAM) device, or some other memory device known in the art.

Data storage device 630 stores data and instructions for processor 610 and comprises one or more devices including a hard disk drive, a floppy disk drive, a CD-ROM device, a DVD-ROM device, a DVD-RAM device, a DVD-RW device, a flash memory device, or some other mass storage device known in the art.

Network controller 680 links apparatus 600 to other devices so that apparatus 600 can communicate with these devices.

System bus 640 represents a shared bus for communicating information and data throughout apparatus 600. System bus 640 represents one or more buses including an industry standard architecture (ISA) bus, a peripheral component interconnect (PCI) bus, a universal serial bus (USB), or some other bus known in the art to provide similar functionality.

Additional components that may be coupled to apparatus 600 through system bus 640 include a display device 650, a keyboard 660, and a cursor control device 670. Display device 650 represents any device equipped to display electronic images and data to a local user or maintainer. Display device 650 is a cathode ray tube (CRT), a liquid crystal display (LCD), or any other similarly equipped display device, screen, or monitor. Keyboard 660 represents an alphanumeric input device coupled to apparatus 600 to communicate information and command selections to processor 610. Cursor control device 670 represents a user input device equipped to communicate positional data as well as command selections to processor 610. Cursor control device 670 includes a mouse, a trackball, a stylus, a pen, cursor direction keys, or other mechanisms to cause movement of a cursor.

It should be apparent to one skilled in the art that apparatus 600 includes more or fewer components than those shown in FIG. 6 without departing from the spirit and scope of the present invention. For example, apparatus 600 may include additional memory, such as, for example, a first or second level cache or one or more application specific integrated circuits (ASICs). As noted above, apparatus 600 may be comprised solely of ASICs. In addition, components may be coupled to apparatus 600 including, for example, image scanning devices, digital still or video cameras, or other devices that may or may not be equipped to capture and/or download electronic data to/from apparatus 600.

FIG. 7 illustrates a more detailed block diagram of the contents of the memory unit in FIG. 6. Generally, memory unit 620 comprises several code modules for controlling a legged robot based on rate of change of angular momentum. Specifically, the code modules in memory unit 620 include main program module 700, value determination module 710, stability determination module 720, and instruction determination module 730.

All code modules 710, 720, 730 are communicatively coupled to main program module 700. Main program module 700 centrally controls the operation and process flow of apparatus 700, transmitting instructions and data to as well as receiving data from each code module 710, 720, 730.

Value determination module 710 performs step 310 of method 300. Stability determination module 720 performs step 320 of method 300. Instruction determination module 730 performs step 330 of method 300.

Main program module 700 instructs value determination module 710 to perform step 310 of method 300. Main program module 700 instructs stability determination module 720 to perform step 320 of method 300. Main program module 700 instructs instruction determination module 730 to perform step 330 of method 300.

5. Additional Embodiments

Although the invention has been described in considerable detail with reference to certain embodiments thereof, other embodiments are possible as will be understood to those skilled in the art. For example, another embodiment is described in "Rate of Change of Angular Momentum and Balance Maintenance of Biped Robots" by A. Goswami and V. Kallem, Proceedings of the 2004 IEEE International Conference on Robotics and Automation (ICRA), New Orleans, La., April 2004, pp. 3785-3790, which is hereby incorporated by reference.

What is claimed is:

1. A computer-implemented method for determining an instruction to send to a legged robot, the method comprising:
   calculating a rate of change of the robot's centroidal angular momentum ($\dot{H}_G$) in accordance with the equation:

$$\dot{H}_G = GP \times R,$$

wherein G represents a location of a center of mass of the robot, R represents a resultant ground reaction force acting upon the robot, P represents a location of a center of pressure of the resultant ground reaction force, GP represents a vector from G to P, and x represents a vector product operation;
   determining whether the rate of change of the robot's centroidal angular momentum ($\dot{H}_G$) exceeds a threshold value, wherein the threshold value is based on one or more factors of a group containing a friction between the robot and a support surface, a torque limit of an actuator of the robot, a design parameter of the robot, and an inertial property of the robot; and
   responsive to determining that the rate of change of the robot's centroidal angular momentum ($\dot{H}_G$) exceeds the threshold value, using a processor to determine an instruction to send to the robot,
   wherein the determined instruction causes the robot to change a resultant ground reaction force acting upon the robot.

2. The method of claim 1, further comprising determining the location of the center of mass of the robot (G) prior to calculating the rate of change of the robot's centroidal angular momentum ($\dot{H}_G$).

3. The method of claim 2, wherein the robot comprises a plurality of segments, and wherein determining the location of the center of mass of the robot (G) comprises determining a location of a segment.

4. The method of claim 2, wherein the robot comprises a plurality of segments, and wherein determining the location of the center of mass of the robot (G) comprises determining a mass of a segment.

5. The method of claim 1, further comprising determining the resultant ground reaction force acting upon the robot (R) prior to calculating the rate of change of the robot's centroidal angular momentum ($\dot{H}_G$).

6. The method of claim 5, wherein determining the resultant ground reaction force acting upon the robot (R) comprises using a force sensor.

7. The method of claim 1, further comprising determining the threshold value.

8. The method of claim 7, wherein determining the threshold value comprises determining a rate of change of a human's centroidal angular momentum.

9. The method of claim 1, wherein the determined instruction causes the robot to enlarge a support polygon.

10. The method of claim 1, wherein the determined instruction causes the robot to enlarge a support polygon, and wherein the enlarged support polygon contains a Zero Rate of change of Angular Momentum point.

11. The method of claim 1, wherein the determined instruction causes the robot to change a location of a center of mass of the robot.

12. A non-transitory computer-readable storage medium storing executable computer program instructions for determining an instruction to send to a legged robot, the computer program instructions performing steps comprising:
    calculating a rate of change of the robot's centroidal angular momentum ($\dot{H}_G$) in accordance with the equation:

$$\dot{H}_G = GP \times R,$$

wherein G represents a location of a center of mass of the robot, R represents a resultant ground reaction force acting upon the robot, P represents a location of a center of pressure of the resultant ground reaction force, GP represents a vector from G to P, and x represents a vector product operation;
    determining whether the rate of change of the robot's centroidal angular momentum ($\dot{H}_G$) exceeds a threshold value, wherein the threshold value is based on one or more factors of a group containing a friction between the robot and a support surface, a torque limit of an actuator of the robot, a design parameter of the robot, and an inertial property of the robot; and
    responsive to determining that the rate of change of the robot's centroidal angular momentum ($\dot{H}_G$) exceeds the threshold value, determining an instruction to send to the robot, wherein the determined instruction causes the robot to change a resultant ground reaction force acting upon the robot.

13. The computer-readable storage medium of claim 12, wherein the computer program instructions perform steps further comprising determining the location of the center of mass of the robot (G) prior to calculating the rate of change of the robot's centroidal angular momentum ($\dot{H}_G$).

14. The computer-readable storage medium of claim 12, wherein the computer program instructions perform steps further comprising determining the resultant ground reaction force acting upon the robot (R) prior to calculating the rate of change of the robot's centroidal angular momentum ($\dot{H}_G$).

15. The computer-readable storage medium of claim 14, wherein determining the resultant ground reaction force acting upon the robot (R) comprises using a force sensor.

16. The computer-readable storage medium of claim 12, wherein the computer program instructions perform steps further comprising determining the threshold value.

17. The computer-readable storage medium of claim 16, wherein determining the threshold value comprises determining a rate of change of a human's centroidal angular momentum.

18. The computer-readable storage medium of claim 12, wherein the determined instruction causes the robot to enlarge a support polygon.

19. The computer-readable storage medium of claim 12, wherein the determined instruction causes the robot to enlarge a support polygon, and wherein the enlarged support polygon contains a Zero Rate of change of Angular Momentum point.

20. The computer-readable storage medium of claim 12, wherein the determined instruction causes the robot to change a location of a center of mass of the robot.

21. A computer system for determining an instruction to send to a legged robot, comprising:
- at least one non-transitory computer-readable storage medium storing executable computer program instructions comprising instructions for: calculating a rate of change of the robot's centroidal angular momentum ($\dot{H}_G$) in accordance with the equation:

$\dot{H}_G = GP \times R,$ wherein G represents a location of a center of mass of the robot, R represents a resultant ground reaction force acting upon the robot, P represents a location of a center of pressure of the resultant ground reaction force, GP represents a vector from G to P, and x represents a vector product operation;
- determining whether the rate of change of the robot's centroidal angular momentum ($\dot{H}_G$) exceeds a threshold value, wherein the threshold value is based on one or more factors of a group containing a friction between the robot and a support surface, a torque limit of an actuator of the robot, a design parameter of the robot, and an inertial property of the robot; and
- responsive to determining that the rate of change of the robot's centroidal angular momentum ($\dot{H}_G$) exceeds the threshold value, determining an instruction to send to the robot, wherein the determined instruction causes the robot to change a resultant ground reaction force acting upon the robot; and
- a processor for executing the computer program instructions.

* * * * *